United States Patent [19]

Claxton

[11] 4,021,743
[45] May 3, 1977

[54] PHASE LOGIC DEMODULATOR

[75] Inventor: Dale H. Claxton, Hawthorne, Calif.

[73] Assignee: TRW Inc., Redondo Beach, Calif.

[22] Filed: June 1, 1976

[21] Appl. No.: 691,738

[52] U.S. Cl. .............................. 329/103; 329/122; 329/123; 329/124

[51] Int. Cl.² ......................................... H03D 3/06

[58] Field of Search .......... 329/101, 103, 104, 107, 329/110, 112, 122, 123, 124; 328/155; 307/233 R, 262; 325/346

[56] References Cited

UNITED STATES PATENTS

| | | | |
|---|---|---|---|
| 3,121,202 | 2/1964 | Gray | 329/124 |
| 3,313,927 | 4/1967 | Raike et al. | 329/107 |
| 3,376,511 | 4/1968 | Brothman et al. | 329/122 |
| 3,609,550 | 9/1971 | Guyer | 329/124 |
| 3,902,129 | 8/1975 | Boothroyd | 329/107 |
| 3,944,940 | 3/1976 | Desai | 329/122 |

Primary Examiner—John Kominski
Attorney, Agent, or Firm—Daniel T. Anderson; Edwin A. Oser; Jerry A. Dinardo

[57] ABSTRACT

A demodulator for a biphase or quadriphase shiftkeying system. The demodulator includes two AND gates for biphase demodulation. The AND gate is one which will provide an output signal if and only if the two input signals are in phase. Each of the AND gates forms a feedback with an injection locked oscillator. Therefore depending on the phase of the input signal, one or the other AND gate provides an output which is then injected at the proper phase into the injection locked oscillator. The output of the AND gates is fed to a data logic and envelope detector to recover the data. For quadriphase phase-shift keying, four AND gates are required. The circuit can be constituted either by transistors or by transferred electron devices sometimes called Gunn effect devices.

17 Claims, 7 Drawing Figures

PHASE LOGIC DEMODULATOR

BACKGROUND OF THE INVENTION

This invention relates generally to digital data transmission systems and particularly relates to a demodulator for a phase-shift keying, suppressed carrier communication system.

It is conventional practice to transmit digital data by phase-shift keying, that is by digital phase modulation of a carrier. In this case, both the amplitude and the angular frequency of the carrier are constant. However, the relative phase of the carrier is suddenly shifted to represent, for example, two or four possible states of the digital code. Hence, usually one of two possible or one of four possible relative phases are transmitted, corresponding to biphase-shift keying or quadriphase shift keying.

It is well known that for this type of digital phase modulation the carrier is suppressed and information is carried by a number of sidebands having a separation equal to the modulation rate.

In order to demodulate such a signal the suppressed carrier may be reconstituted. This carrier must be locally generated in phase with the carrier at the transmitter. Presently available techniques for demodulating such a phase modulated carrier fall into two general classes. One type of demodulator is known as a coherent demodulator, while the other uses phase comparison and is sometimes known as a differentially coherent demodulator. However, there are disadvantages to both of these previously known demodulators.

Coherent demodulation involves various methods of reconstituting the carrier from the received suppressed carrier signal. Then the local carrier must be phase locked to that of the transmitter. Once such a phase coherent carrier has been reconstructed the data is recovered by multiplying the incoming suppressed carrier signal by the reconstructed carrier. The desired data is one of the multiplication products.

The difficult and awkward part of the coherent demodulation is the reconstruction of the carrier. This may, for example, be effected by a squaring loop demodulator. Here the incoming signal is frequency doubled which removes the modulation. The resulting signal is then phase locked to a voltage-controlled oscillator and its output is divided by two to demodulate the input signal. However, it is difficult to construct the necessary frequency doubler, the frequency divider and the high frequency phase detector.

Another well known coherent demodulator is a so-called Costas loop. This prior art loop has been discussed in a prior patent to Lanning, U.S. Pat. No. 3,787,775, which is assigned to the assignee of the present application. Reference to the Costas loop is found in column 1, beginning at line 28.

One side of the Costas loop behaves like a phase locked loop except that the error signal has the incorrect sign for one of the input phase states. The sign of the error signal is corrected by the other side of the loop which also provides the data output. It is true that the hardware of the Costas loop is easier to implement than that of the squaring loop demodulator; but on the other hand, a relatively large number of components is required for this demodulator.

The other type of demodulator is the differentially coherent demodulator. It is much simpler than the coherent demodulator. However, its performance is also inferior. In this case the phase detector compares the phase states of two successive bit periods and provides an output when a phase change occurs.

This type of demodulator does not require an oscillator for reconstituting the carrier wave. However, it has two limitations. In the first place, it is useful for only a single data rate corresponding to the duration of the one bit delay. The other limitation is that the differentially coherent demodulator requires a higher ratio of signal-to-noise at its input to provide the same probability of error as the coherent demodulator.

It is accordingly an object of the present invention to provide a new type of demodulator for a biphase or quadriphase phase-shifted signal which can be used for data rates ranging from direct current to say 1/10 of the carrier frequency.

Another object of the present invention is to provide a phase modulator which can readily be implemented by either transistors or by transferred electron devices.

SUMMARY OF THE INVENTION

In accordance with the present invention there is provided a phase logic demodulator for a phase-shift keying, suppressed carrier communication system. The demodulator comprises a first and a second AND gate. Each AND gate may be defined as a device which generates as an output if a reproduction of the input signal and only if its two inputs are approximately in phase.

The phase modulated input signal is impressed simultaneously on both AND gates. There is further provided an injection-locked oscillator having two outputs, one of which is 180° phase-shifted with respect to the other.

The phase modulated input signal is impressed simultaneously on both AND gates. There is further provided an injection-locked oscillator having two outputs, one of which is 180° phase-shifted with respect to the other.

The output of the first AND gate is impressed on the injection-locked oscillator and the output of the second AND gate is also impressed on the oscillator but shifted in 180° phase.

Hence, it will be apparent that depending on the phase of the input signal, one of the AND gates will provide an output because its two input signals will be in phase. The reason for this is that the two oscillator outputs are 180° out of phase.

Finally, an envelope detector is connected to the outputs of the two AND gates for recovering or generating the data.

A similar circuit with four AND gates may be provided for a quadriphase shifted input signal.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings.

DESCRIPTION OF THE PREFERRED EMBODIMENTS

Figure 1:
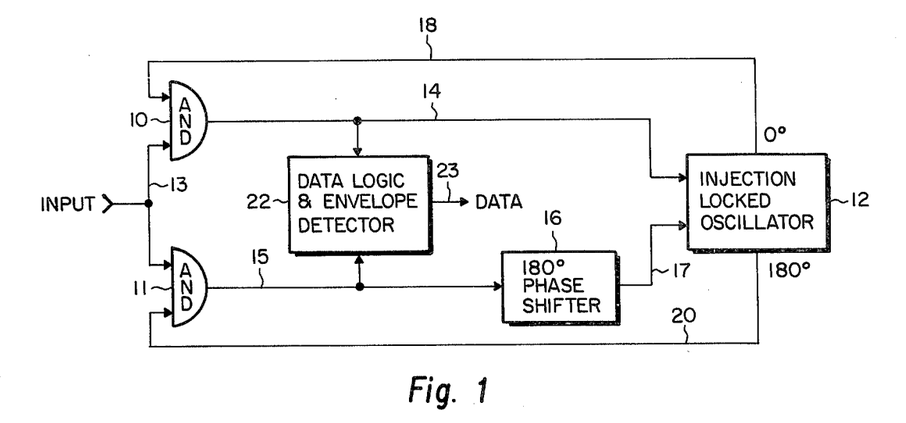
FIG. 1 is a diagram in block form of a phase logic demodulator embodying the present invention for a biphase-shift keying system.

Referring now to FIG. 1, there is illustrated a phase logic demodulator in accordance with the present invention. As will be subsequently shown the demodulator of the invention has nearly the simplicity of the differentially coherent demodulator but it doesn't have its serious limitations previously discussed. On the other hand, it has the performance of the coherent demodulator without requiring the complex circuitry of the coherent demodulator.

The circuit of FIG. 1 includes two AND gates 10 and 11. As explained before, each AND gate has two inputs upon which sinusoidal waves are impressed by input lead 13. If the two input waves are in phase an output is generated; otherwise not. When generated, the output is a reproduction of the input signal. There is also provided an injection-locked oscillator 12. Such an oscillator is locked by a feedback path through one of the two AND gates 10 and 11. Hence, the output of AND gate 10 obtained from lead 14 is impressed on one input of oscillator 12. The output of AND gate 11 obtained from lead 15 is also impressed on the input of oscillator 12, but through a 180° phase shifter 16. Hence, the two signals impressed on oscillator 12 by leads 14 and 17 are in phase.

On the other hand, the output of oscillator 12 obtained from lead 18 is 180° out of phase with respect to that obtained from output lead 20. The two oscillator outputs which are 180° out of phase with respect to each other are impressed by lead 18 on AND gate 10 and by lead 20 on AND gate 11.

The operation of the circuit of FIG. 1 will now be evident. The AND gate outputs available from leads 14 and 15 may be amplified by the AND gates and are hence amplified reproductions of the input signal. They are also phase coherent with the transmitted signal. Thus when the AND gate 10 produces an output signal the input signal must be in phase with the oscillator output from lead 18. If the AND gate 11 generates an output which is 180° phase shifted by the phase shifter 16, the input signal must be 180° out of phase so that it is in phase with the oscillator signal available from lead 20.

Hence the phase relationships about the upper feedback loop represented by lead 18, AND gate 10, lead 14 and oscillator 12 and the lower feedback loop lead 17 back to oscillator 12 formed by lead 20 AND gate 11, lead 15, are arranged in such a manner that the oscillator injecting signal is at the same phase regardless of which AND gate provides the input.

The data is now demodulated by a data logic and envelope detector 22 having its inputs connected to the outputs of the two AND gates 10 and 11 by the leads 14 and 15. Hence, the recovered data is available from output lead 23 of detector 22. It should be noted that the phase shifter 16 may also be considered as an inverter of the output of AND gate 11.

Figure 2:
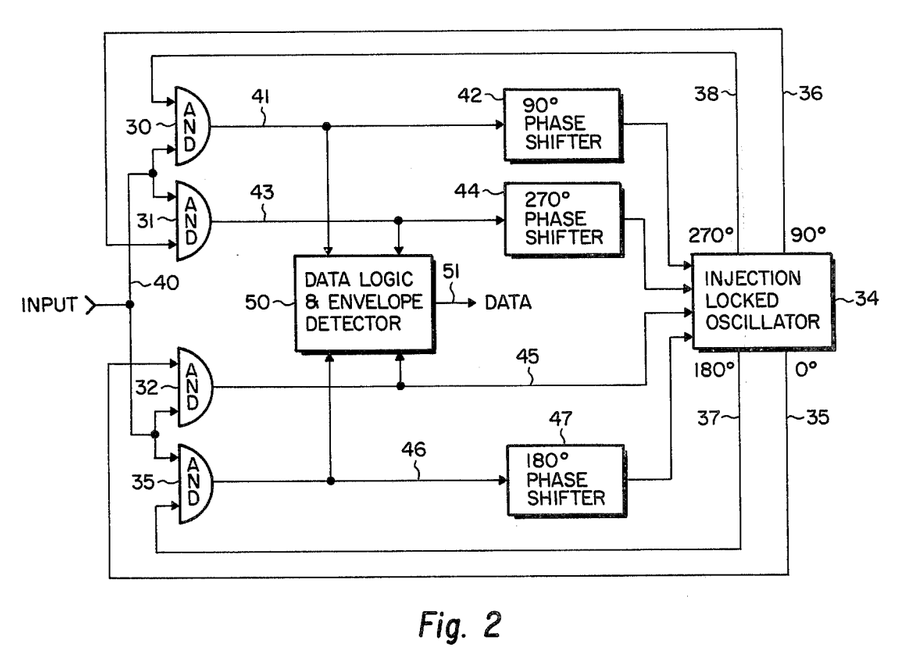
FIG. 2 is a circuit diagram in block form of a corresponding phase logic demodulator in accordance with the invention for a quadriphase shift keying input signal.

Referring now to FIG. 2, there is illustrated another phase logic demodulator in accordance with the present invention suitable for a quadriphase shift keying signal. The circuit of FIG. 4 now requires four AND circuits 30, 31, 32 and 33. It also requires a single injection locked oscillator 34 which now has four outputs available from leads 35, 36, 37 and 38 which respectively have 0°, 90°, 180° and 270° relative phase shift.

The input signal is again applied by a lead 40 to all four AND gates 30 – 33. The oscillator output at 270° phase shift is applied by lead 38 to the second input of AND gate 30. Similarly, the 90° phase oscillator output is impressed by lead 36 on the second input of AND gate 31. AND gate 32 receives the 0° phase output of oscillator 34 from lead 35. Finally, AND gate 33 has a second input connected by lead 37 to that output of oscillator 34 having 180° phase shift.

The output of AND gate 30 is available from lead 41 and is impressed on one of the four inputs of oscillator 34 through a 90° phase shifter 42. This corresponds to the 270° phase of the oscillator output impressed on AND gate 30. Similarly the output of AND gate 31 is impressed by lead 43 and 270° phase shifter 44 on another input of the oscillator 34. The output of AND gate 32 is impressed by lead 45 directly on the oscillator 34. Finally, the output of AND gate 33 is impressed by lead 46 and by 180° phase shifter 47 on the oscillator 34.

It will now be apparent like in the case of the circuit of FIG. 1, that each of the four feedback loops including the respective four AND gates 30 – 33 is so arranged that the outputs of the oscillator 34 are all in phase with that input signal causing one of the AND gates to conduct. It will further be evident that this will keep the injection locked oscillator 34 in phase with the oscillator at the transmitter.

Similar to the circuit of FIG. 1, there is again provided a data logic and envelope detector 50 having its four inputs connected to the leads 41, 43, 45 and 46, that is to the outputs of the four AND gates 30 – 33. The data which has thus been recovered is available from output lead 51 of the detector 50.

From what has been said before, the operation of the circuit of FIG. 2 will be apparent.

As indicated before, both circuits of FIGS. 1 and 2 may be realized by discrete transistors or integrated transistor circuits. Discrete transistors are appropriate for carrier frequencies up to about 500 mhz. For carrier frequencies from say 300 mhz to 2 ghz integrated transistor circuits are preferably used. It is also feasible to implement these circuits of FIGS. 1 or 2 with transferred electron devices. Such a circuit would be useful for carrier frequencies from 1 ghz to about 50 ghz. Concerning transferred electron devices, sometimes known as Gunn effect devices, reference is made to the Applicant's prior U.S. Pat. No 3,918,009 relating to a phase modulator and assigned to the assignee of the present application. In this patent in column 1, lines 6 – 25 there is found a discussion of Gunn effect devices and specifically Gunn triodes which can serve as amplifiers.

Before discussing a modulator in accordance with the present invention using transferred electron devices, it is believed to be appropriate to first discuss a discrete transistor circuit of the modulator of FIG. 1. Such a circuit has been illustrated in FIGS. 3a, 3b, 3c, to which reference will now be made.

Figure 3A:
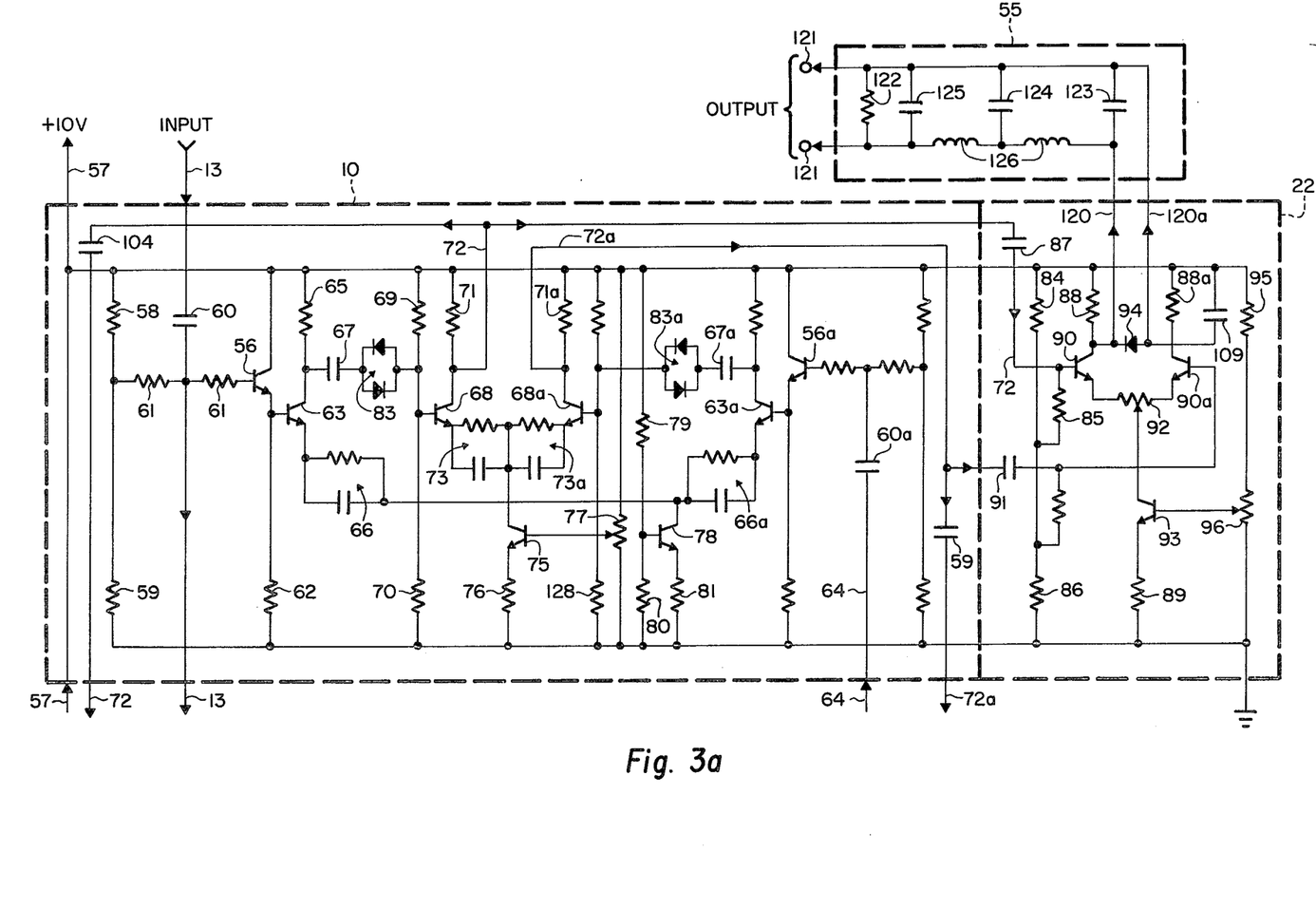
FIGS. 3a, 3b and 3c jointly are a detailed circuit diagram of the demodulator of FIG. 1 utilizing transistors and suitable for a frequency range to 500 mhz for discrete transistors and up to 2 ghz for integrated circuits.
Figure 3B:
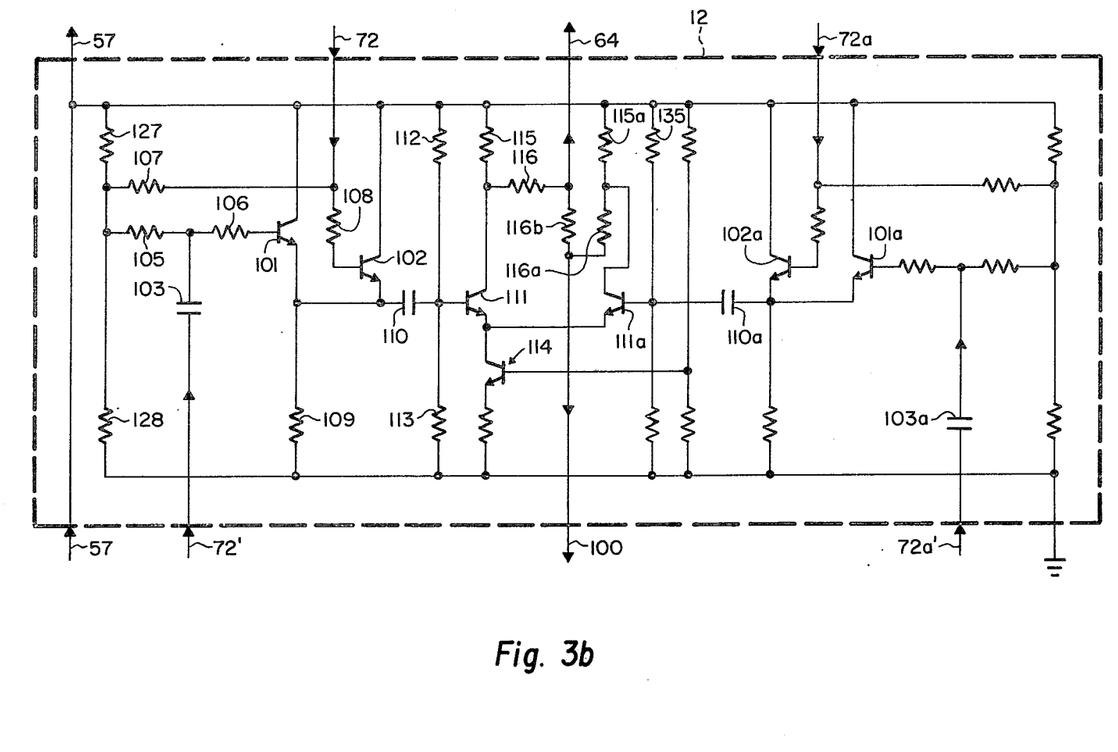
Figure 3C:
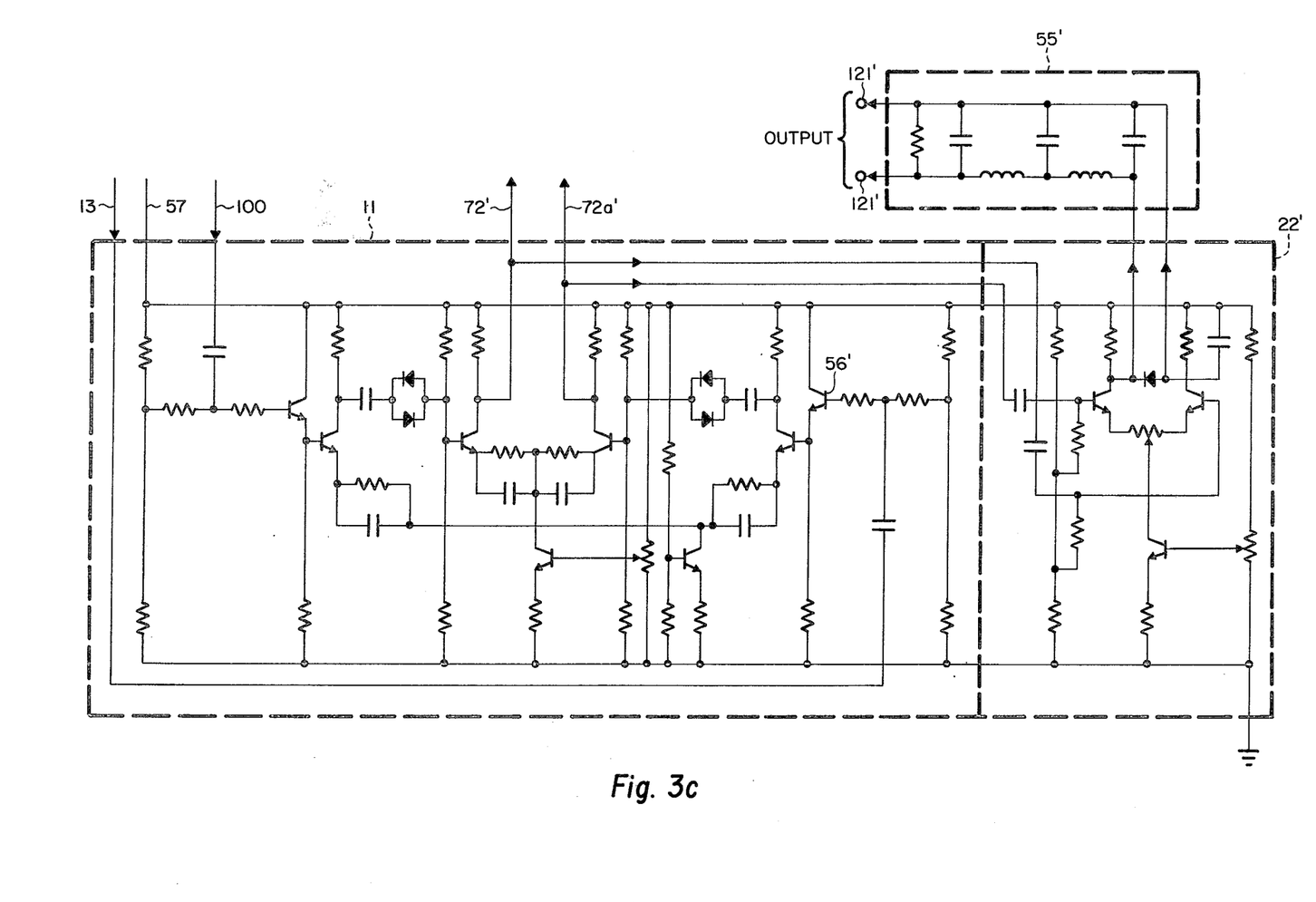

FIG. 3a shows the AND gate 10 of FIG. 1 followed by a balanced detector 22 corresponding to the envelope detector FIG. 1. This in turn is followed by a low pass filter 55. FIG. 3c illustrates the corresponding AND gate 11 followed by its balanced detector 22' and a low pass filter 55'. The circuit of FIG. 3c is identical to that of 3a and hence need not be described in detail. Corresponding elements of FIG. 3c will be designated with the same reference numbers primed. FIG. 3b illustrates the injection-locked oscillator 12.

While the circuits of FIGS. 3a, 3b and 3c show discrete transistors, it will be understood that it is within the scope of the present invention to utilize integrated transistor circuits instead. As pointed out before, the choice of discrete or integrated components will depend primarily on the desired carrier frequency.

Referring now specifically to FIG. 3a, and to the AND gate 10, it will be noted that the AND gate consists of two identical portions. The right-hand portion is identified by the same reference numbers followed by a and the AND gate 10 includes a pair of transistors 56 and 56a which are emitter follower transistors. The base of transistor 56 is biased from a positive voltage source 57 through a biasing network 58, 59 connected between the voltage source 57 and ground. The input signal obtained from lead 13 is impressed through a blocking capacitor 60 between the junction point of a pair of resistors 61 and hence on the base of transistor 56. The output signal obtained from its emitter is developed across an emitter resistor 62 and is then impressed on a transistor 63 which together with a transistor 63a forms a differential pair of transistors. Since the emitter follower transistor 56a is identical to the emitter-follower transistor 56, it need not be further disclosed. However, it should be pointed out that the lead 64 carries an oscillator signal from the locked oscillator of FIG. 3b which is 180° out of phase with respect to another oscillator output signal. This will be subsequently described. Hence, it will be evident that the two emitter-follower buffer transistors 56, 56a will impress respectively the input signal from input lead 13 and the oscillator signal from lead 64 on the differential amplifier pair.

Accordingly, these two signals are not impressed on the two transistor amplifiers 63, 63a which form a first differential pair. Both differential amplifiers have a base input and collector output. The collector of transistor 63 is biased by resistor 65 connected to the voltage supply. The two emitters of transistors 63 and 63a are connected together through respective RC networks 66 and 66a.

The output signal of transistor 63 is derived from its collector and is impressed through a coupling capacitor 67 on the base of another transistor 68. Transistor 68 together with transistor 68a form the second or interior pair of the two stage differential amplifier. The base of transistor 68 is biased by a pair of resistors 69, 70 again connected between the voltage source and ground. The collector is biased by a resistor 71 connected to the voltage supply 57 and the output is taken by lead 72 from the collector of transistor 68. The other output of transistor 68a is obtained from lead 72a and is 180° out of phase with respect to that on lead 72. The two emitters are connected to each other through respective RC networks 73 and 73a. The two resistors of the network 73, 73a tend to reduce the gain of the amplifier while the two capacitors flatten the response curve. The junction point between the two networks 73, 73a is connected to a transistor 75 connected as a constant current source. Hence, the collector is connected to the junction point of the two networks 73, 73a, while the emitter is connected to ground through a resistor 76. A resistor 77 is connected between the voltage supply and ground and has a variable tap connected to the base of transistor 75 for controlling the operating conditions of the constant current source.

A similar constant current source is formed by the transistor 78 having its base provided with a bias voltage by the voltge divider 79, 80; its collector is connected between the two networks 66 and 66a to provide a constant current source for the outer differential amplifier pair 63, 63a. The center is connected to ground by a resistor 81. A pair of diodes 83 connected in parallel and in opposition may be connected between the coupling capacitor 67 and the base of transistor 68. The purpose of the diodes is to sharpen the response characteristic of the AND circuit as a function of phase. Thus, the output of the AND circuit obtained on either lead 72 or 72a is proportional to the phases of the two input signals on input lead 13 and oscillator lead 64 being greatest when the input signals differ in phase by 180°. The provision of the pair of diodes 83 will reduce the response over the range of phase angles. However, the pairs of diodes 83, 83a may be omitted.

It should be noted that the operation of the two diodes 83 or 83a is based on the fact that each of the diodes requires a certain voltage before it begins to conduct.

Figure 4:
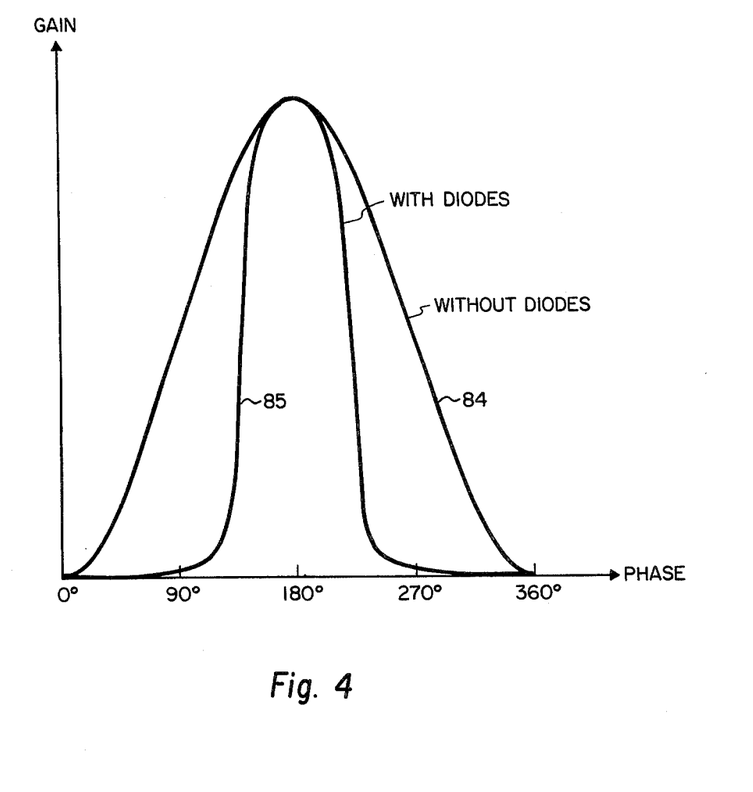
FIG. 4 is a chart illustrating the response of the transistor circuit of FIGS. 3a to 3c without pairs of diodes and with diodes to show the sharpened response available thereby.

In this connection reference is made to FIG. 4 which shows the response of the AND circuit 10 without the diodes as evidenced by the curve 84. This illustrates the gain as a function of phase angle. With the diodes 83 or 83a the response is sharpened as shown by curve 85. Thus the base of transistor 93 is biased by resistors 95, 96 connected between the voltage source and ground, a variable tap or resistor 96 being connected to the base. A resistor 89 is connected between the emitter of transistor 93 and ground.

Referring now to the block 22, there is shown the envelope detector or buffer detector which follows the AND circuit 10. The output signal of AND circuit 10 obtained from lead 72 is impressed through a blocking capacitor 87 on the base of a transistor 90 which together with the transistor 90a forms another differential pair. The other output circuit of AND circuit 10 obtained from lead 72a is impressed on the base of transistor 90a by coupling capacitor 91. The two output signals of the AND circuit 10 are 180° out of phase. Otherwise, the differential amplifier pair 90, 90a, is connected as previously described without, however, utilizing the RC networks such as 73, 73a. The base of transistor 90 is connected by resistors 89, 85 to the positive voltage source, the junction point of which is connected to ground by resistor 86. The collector is connected to the voltage source by resistor 88. Accordingly, a single resistor 92 interconnects the two emitters, while a constant current source formed by the transistor 93 is connected thereto by a variable tap.

The constant current source 93 is again connected as peviously described.

A diode 94 is connected between the collectors of the two transistors 90, 90a and this diode provides the output detector. The differential amplifier pair 90, 90a also operates as a buffer for the two input signals. The collector of transistor 90a is connected to the positive voltage supply by resistor 88a bypassed by a capacitor 109.

Accordingly two output signals are obtained from leads 120 and 120a which are connected to the low pass filter 55 which is a conventional LC filter. The output signal, that is the desired data, is obtained from output terminals 121, across which the resistor 122 is connected. The purpose of the low pass filter is to remove the radio frequency, that is the carrier sidebands. It consists of parallel capacitors 123, 124, 125 and two inductors 126.

Referring now to FIG. 3b, there is illustrated the injection locked oscillator 12. Various input leads are connected to the oscillator 12. Thus lead 57 applies a positive bias voltage. Leads 72 and 72a furnish the signal output of AND gate 10 180° out of phase. Similarly input leads 72' and 72a' are obtained from AND gate 11 in a corresponding manner. On the other hand, the injection locked oscillator 12 has two outputs, one available from lead 64 as previously discussed. The other output is available from output lead 100 which is the oscillator signal 180° out of phase with respect to that available from lead 64. This signal is impressed on AND gate 11.

The two input signals from input lead 72' from AND gate 11 and that from AND gate 10 available from lead 72 are fed into the oscillator by two separate buffer transistors 101 and 102, each being an emitter-follower.

The signal from lead 72' is impressed through a blocking capacitor 103 and that on lead 72 through blocking capacitors 104 shown in FIG. 3a. The base of each buffer amplifier 101 is biased by a bias network consisting of two resistors 127, 128 connected between the voltage supply from lead 57 and ground. The signals are injected between the junction point of a pair of resistors 105, 106 onto the base of transistor 101. Similarly, the signals from lead 72 are injected through the junction point of a pair of resistors 107, 108 to the base of transistor 102. The two emitters of transistors 101 and 102 are connected to ground through a common resistor 109.

It will be realized that a similar pair of buffer amplifiers 101a and 102a are utilized to buffer the inputs from input leads 72a' and 72a, all connections being the same as previously described.

Hence a coupling capacitor 110 impresses the output signal of the two emitters of transistors 101 and 102 on the base of a transistor 111 which forms one half of another differential amplifier pair. The other half of the differential amplifier is 111a. The base of transistor 111a is supplied with the outputs of the two buffer amplifiers 101a and 102a by coupling capacitor 110a. The base of transistor 111 is biased by a bias network consisting of a pair of resistors 112, 113 connected between the voltage source and ground. The two emitters of transistors 111 and 111a are supplied with a constant current by a constant current source including the transistor 114 which operates as previously described.

The output of transistor 111 is developed across its collector resistor 115. Similarly the output of transistor 111a is developed across its collector resistor 115a. The output of transistor 111a is impressed through resistors 116a and 116b onto the output lead 64. The output of transistor 111a is impressed through resistors 116a on output led 100 and hence the two oscillator signals on leads 64 and 100 are 180° out of phase with respect to each other. Resistor 116b connected between lead 64 and 100 is an isolation resistor.

It will now be evident that the AND gate 11 of FIG. 3c is identical to the AND gate 10 of 3a; as are the detector 22' which is similar to detector 22 of FIG. 3a and the low pass filter 55' which corresponds to filter 55 or FIG. 3a. The input signal is impressed on AND gate 11 by lead 13 and leave in transistor 56', while lead 57 furnishes the positive voltage. Input lead 100 supplies the oscillator voltage to the AND gate. As explained before, the two outputs of the AND gate 11 obtainable from leads 72' and 72a' and back through output lead 100 through the AND gate 11. Similarly, for the other loop the feedback path can be traced through input lead 72 and 72a and back through output lead 64 through AND gate 10.

It will be understood that the circuit specifications of the transistor demodulator of FIGS. 3a, 3b, 3c may vary according to the design for any particular application. The following circuit specifications are included by way of example only as suitable for a phase demodulator having a carrier frequency up to about 500 mhz and having a positive voltage supply of +10 volts. Only components of the circuit of FIGS. 3a and 3b are shown; and elements designated by reference numbers followed by an *a* are omitted to avoid duplication.

| | |
|---|---|
| All transistors | Type 2N3904 |
| Diode 94 | Type IN3600 |
| All other diodes | Type IN3062 |
| Inductors 126 | 1 millihenry |
| Capacitors 60, 104, 67, 59, 91, 87, 109, 103, 110 | 6.8 microfarad |
| The capacitor of networks 73, 66 | 100 picofarad |
| Capacitors 123, 125 | 130 picofarad |
| Resistor 58 | 4.7 K ohms |
| The first resistor of network 61 | 620 ohms |
| Second resistor of network 61 | 100 ohms |
| Resistor 65 | 1K ohms |
| Resistor 70 | 4.7 K ohms |
| Resistor 69 | 5.1 K ohms |
| Resistor 71 | 1 K ohms |
| Each of the resistors of networks 73 and 66 | 200 ohms |
| Resistor 62 | 10 K ohms |
| Resistor 76 | 240 ohms |
| Resistor 77 | 10 K ohms variable |
| Resistor 81 | 240 ohms |
| Resistor 127 | 4.7 K ohms |
| Resistor 107 | 1 K ohms |
| Resistor 105 | 1 K ohms |
| Resistor 106 | 500 ohms |
| Resistor 108 | 500 ohms |
| Resistor 112 | 5.6 K ohms |
| Resistor 115 | 2 K ohms |
| Resistor 116 | 3 K ohms |
| Resistor 116b | 1 K ohms |
| Resistor 116a | 3 K ohms |
| Resistor 115a | 2 K ohms |
| Resistor 128 | 5.6 K ohms |
| Resistor 109 | 5.1 K ohms |
| Resistor 113 | 4.7 K ohms |
| The emitter resistor of constant current source 114 | 500 ohms |
| The voltage divider network for the base of the constant current source 114 | 9.2 K ohms and 1.8 K ohms respectively |
| Resistor 84 | 5.6 K ohms |
| Resistor 85 | 1 K ohms |

-continued

| Resistor 86 | 5.1 K ohms |
| Resistor 92 | 100 ohms variable |
| Resistor 88 | 2 K ohms |
| Resistor 88a | 2 K ohms |
| Resistor 95 | 5.6 K ohms |
| Resistor 96 | 5 K ohms variable |
| Resistor 89 | 510 ohms |
| Resistor 122 | 2 K ohms |

While FIGS. 3a, 3b and 3c show, by way of example, how the phase demodulator of the invention may be realized by discrete or integrated transistors, it is also possible to utilize other devices for the realization of the demodulator of the invention. Hence, by way of example, the demodulator of the invention may consist of three or more transferred electron devices or Gunn effect diodes.

Figure 5:
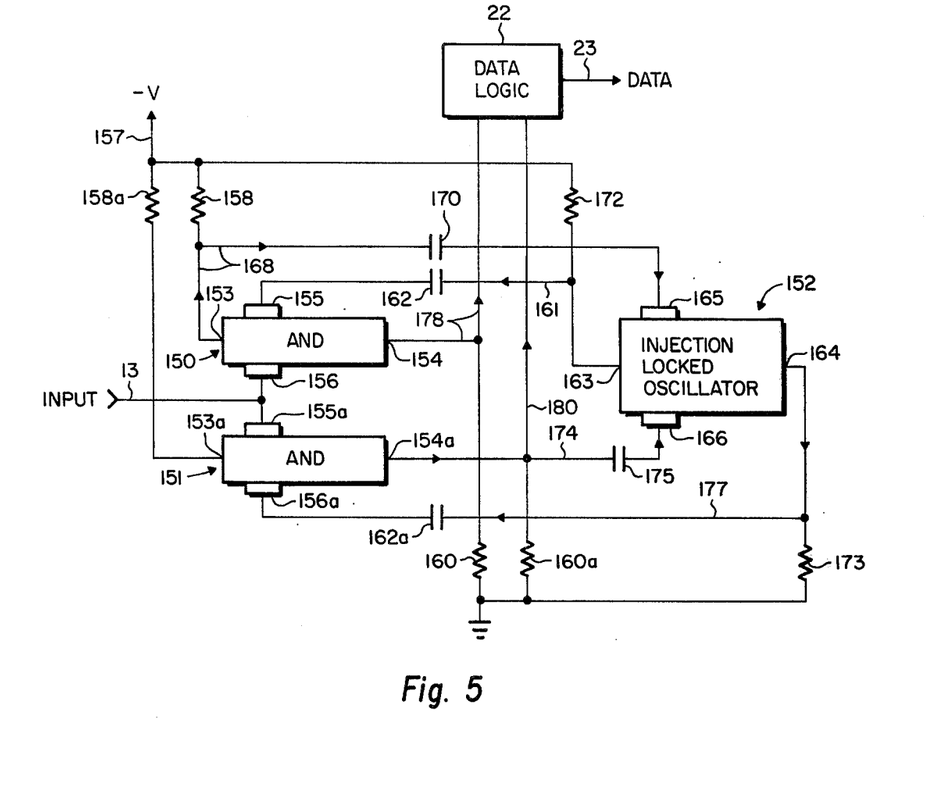
FIG. 5 is a circuit diagram of a demodulator in accordance with the present invention for a biphase shift keying signal and utilizing transferred electron devices.

Such a circuit has been illustrated in FIG. 5 to which reference is now made. The circuit of FIG. 5 corresponds to that of FIG. 1 and is intended to demodulate a biphase modulated input signal. The circuit of FIG. 5 includes an AND gate 150, a second AND gate 151 and an injection-locked oscillator 152. All three devices consist of planar transferred electron devices having a cathode, anode and two Schottky barrier gates. The construction and operation of a four electrode transferred electron device is nearly the same as that of the three electrode transferred electron device which has explained in connection with FIGS. 1 and 2 of the Applicant's prior patent above referred to. The second gate operates in the same way as the first gate. The device is biased such that inputs must be present and in place on both gates to cause an output.

The device 150 includes a cathode 153 and an anode 154 between which a bias voltage is applied which is not sufficient to cause domain nucleation. The AND gate 150 also includes two rectifying electrodes of the Schottky barrier type 155 and 156. It will be understood that the cathode 153 and anode 154 are ohmic electrodes.

A source of negative voltage 157 is applied to the cathode 153 through a bias resistor 158. The anode 154 is grounded through a bias resistor 160. The input signal 13 is applied to one of the rectifying electrodes 156, while one of the outputs of the injection-locked oscillator 152 is applied to the other Schottky electrode through a lead 161 and a blocking capacitor 162.

It will now be evident that if the phase of the input signal applied to Schottky barrier electrode 156 is in phase with the oscillator signal impressed by lead 161, domain nucleation will begin. Accordingly, an output signal may either be obtained from the anode 154 or from the cathode 153, the two output signals being 180° out of phase.

The injection-locked oscillator also is provided with a cathode 163 and an anode 164. It is furthermore provided with two Schottky barrier electrodes 165 and 166. As explained before, the oscillatory wave generated by the oscillator 152 and its feedback path and obtained from cathode 163 or anode 164 are also 180° out of phase. The output signal obtained from the cathode 153 of device 150 is obtained from lead 168 and impressed through coupling capacitor 170 onto the Schottky barrier electrode 165 of the oscillator. Hence, one feedback path of the oscillator can be traced from the oscillator cathode 163, output lead 161, capacitor 162, Schottky barrier electrode 155 and of AND gate 150, cathode 153, lead 168, capacitor 170, back to the Schottky barrier electrode 165 of the oscillator. This represents the first or upper feedback loop. A signal will be obtained from the cathode 153 when the input signal on lead 13 is in phase with the oscillator signal on lead 161.

The oscillator 152 should be so biased that it is always capable of amplifying or oscillating. To this end the voltage source 157 is connected to the cathode 163 through a bias resistor 172, while the anode 164 is connected to ground through bias resistor 173. The two resistors 172 and 173 should be slightly smaller than the bias resistors 158 and 160. Thus, by way of example, bias resistors 158 and 160 may have a resistance of 220 ohms, while bias resistors 172 and 173 may have a resistance of 200 ohms.

The injection-locked oscillator 152 is a negative resistance device and due to its different bias it is pushed into the negative resistance region. The injection-locked oscillator 152 may, for example, consist of GaAs and may be doped by an excess of As atoms. Thus, if $n_o$ is the number of atoms per cubic centimeter and the length of the device, $n_o$ X to $10^{13}$. Hence, if is $10^{-13}$, $n_o$ is $10^{16}$. This is the excess of the doping atoms. The AND gates 150 and 151 may be identical devices, but biased differently.

For convenience the components of the lower feedback loop will be designated by the same reference numbers followed by an a. Thus, the cathode 153a and the anode 154a of the AND gate 151 are biased by a resistor 158a between the cathode and the negative voltage source and a resistor 160a between the anode and ground. Instead of injecting the signal from the cathode, the signal from the anode 154a is impressed on the Schottky barrier electrode 166 by a lead 174 and a blocking capacitor 175. The oscillator output obtained from the anode 164 of the oscillator is impressed on the Schottky barrier electrode 168 by a coupling capacitor 162a, while the input signal from input lead 13 is impressed on the barrier electrode 155a.

Since the output of the anode 154a of AND gate 151 is 180° out of phase with the output from cathode 153 of AND gate 150, there is no need to provide a phase shifter such as shown at 16 in FIG. 1.

The feedback path for the lower loop of the circuit of FIG. 5 can be traced from the anode 164 of oscillator 152 through lead 177, coupling capacitor 162a, Schottky barrier electrode 156a of AND gate 151, anode 154a, lead 174, coupling capacitor 175 and Schottky barrier electrode 166 back to the oscillator.

It will, therefore, be understood that either the upper or the lower feedback loop will be active depending upon the phase of the input signal. In any case, the injection-locked oscillator remains energized to oscillate at the carrier frequency regardless of the phase of the input signal.

The output data is again obtained from the data logic 22 connected by lead 178 from the anode 154 of AND gate 150 to one input of the data logic 22. The other input is from the anode 154a of AND gate 151 through lead 180 to the second input of data logic 22. The recovered data is then obtained from output lead 23.

There has thus been disclosed a phase logic demodulator for a biphase or quadriphase modulated input signal. The demodulator consists essentially of two or four AND gates, an injection-locked oscillator, respective phase shifting means and an envelope detector.

The circuit can be realized by discrete or integrated transistors or else by transferred electron devices depending on the frequency of the carrier. It features improved peformance over the differentially coherent demodulator in that it can be used for data rates from as low as direct current to approximately 1/10 of the carrier frequency. In addition, it is capable of operating with a lower signal-to-noise ratio than a differentially coherent demodulator for a desired bit error probability. This is due to te fact that the injection-locked oscillator is always phase coherent with the transmitter oscillator. While the phase demodulator of the invention is comparable in complexity to the differentially coherent demodulator, it is much simpler in construction than a coherent demodulator. The latter is restricted to operate over a bandwith of only a few percent. On the other hand, the injection-locked oscillator of the invention can be made to cover a much wider band.

What is claimed is:

1. In a phase-shift keying, suppressed-carrier communication system, a phase logic demodulator comprising:
   a. a first AND gate;
   b. a second AND gate;
   c. means for impressing a phase modulated signal simultaneously on both of said AND gates;
   d. an injection locked oscillator having two outputs, one of which is 180° phase shifted with respect to the other;
   e. means for impressing the output of said first AND gate on said oscillator and for impressing one of the outputs of said oscillator on said first AND gate;
   f. means including 180° phase shift for connecting the output of said second AND gate on said oscillator and for impressing the second output of said oscillator back on said second AND gate; and
   g. an envelope detector connected to the outputs of both of said AND gates for generating the data.

2. A demodulator as defined in claim 1 wherein each of said AND gates consists of a differential amplifier pair.

3. A demodulator as defined in claim 2 wherein said injection locked oscillator consists of a differential amplifier pair having two outputs 180° out of phase with respect to each other.

4. A demodulator as defined in claim 1 wherein each of said AND gates consists of a transferred electron device having a cathode and an anode, wherein the cathode of a first AND gate and the cathode of the other AND gate is coupled to said injection locked oscillator.

5. A demodulator as defined in claim 4 wherein said injection locked oscillator consists of a transferred electron device having a cathode and an anode and wherein the cathode of the transferred electron device representing said oscillator is connected to said first AND gate and its anode to said other AND gate.

6. In a quadriphase-shift-keying, suppressed-carrier communication system, a demodulator comprising:
   a. a first, a second, a third, and a fourth AND gate;
   b. an injection locked oscillator having four outputs, each being shifted in phase with respect to another by 90°;
   c. means for impressing a phase-shifted input signal simultaneously on each of said four AND gates;
   d. means including a 90° phase shifter for connecting the output of said first AND gate to a first input of said injection locked oscillator;
   e. means including a 270° phase shifter for connector the output of said second AND gate to a second input of said oscillator;
   f. means for connecting the output of said third AND gate to third input of said oscillator;
   g. means including a 180° phase shifter for connecting the output of said fourth AND gate to a fourth input of said oscillator;
   h. means for connecting a reference or zero phase output of said oscillator to said third AND gate;
   i. means for connecting the 90° phase shifted output of said oscillator to said first AND gate;
   j. means for connecting the 270° phase shifted output of said oscillator to said second AND gate;
   k. means for connecting the 180° phase-shifted output of said oscillator to said fourth AND gate, whereby one of said AND gates provides an output if the input signal is in phase with the oscillator wave impressed thereon; and
   l. an envelope detector having four inputs connected to the outputs of said AND gates for developing the output data.

7. In a phase-shift keying, suppressed-carrier communication system, a demodulator comprising:
   a. a first and a second AND circuit;
   b. each of said AND circuits including a first differential amplifier pair having two outputs 180° out of phase with respect to each other;
   c. an envelope detector for each of said AND gates, each of said envelope detectors including a second differential amplifier pair having two inputs connected to the two outputs of said first differential amplifier pair 180° out of phase, and a detector coupled between said second differential amplifier pair;
   d. a low pass filter coupled to each of said envelope detectors;
   e. an injection locked oscillator comprising a third differential amplifier pair having two outputs 180° out of phase with respect to each other;
   f. means for impressing the output of each of said AND circuits being 180° out of phase with respect to each other on said third differential amplifier pair;
   g. means for injecting the outputs of said oscillator on each of said AND circuits; and
   means for impressing a biphase key-shifted input signal on each of said AND circuits.

8. A demodulator as defined in claim 7 wherein said differential amplifier pairs consist each of two transistors.

9. A demodulator as defined in claim 8 wherein each of said AND circuits includes a fourth differential amplifier pair consisting of two transistors coupled to said first differential amplifier pair.

10. A demodulator as defined in claim 8 wherein an RC circuit is connected to the emitters of each of the four transistors of said first and fourth differential amplifier pair.

11. A demodulator as defined in claim 9 wherein an emitter follower transistor is coupled to the input of each of said fourth differential amplifier pair of each of said AND gates.

12. A demodulator as defined in claim 9 wherein a pair of oppositely poled diodes is provided between each of the two transistors of said fourth differential amplifier pair and the following transistor of said first amplifier pair for each of said AND gates.

13. A demodulator as defined in claim 9 wherein a first transistor connected as a constant current source is coupled to second transistor connected as a constant current source is coupled to said first differential amplifier pair and to said fourth differential amplifier pair for each AND circuit.

14. A demodulator as defined in claim 8 wherein a transistor connected as a constant current source is coupled to said second differential amplifier pair.

15. A demodulator as defined in claim 8 wherein a transistor connected as a constant current source is connected to each of said three differential amplifier pairs.

16. A demodulator as defined in claim 8 wherein a first emitter follower amplifier is connected to the inputs of each of said third differential amplifier pair for impressing thereon the two outputs of said second AND gate which are 180° out of phase, and wherein an additional emitter follower transistor is coupled to the inputs of each of said third differential amplifier pair for impressing thereon the two outputs of said first AND gate which are 180° out of phase, thereby to provide a feedback path for said oscillator.

17. A demodulator as defined in claim 16 wherein said injection-locked oscillator generates two outputs 180° out of phase with respect to each other and means for impressing each of said outputs on one of said AND gates to complete the feedback path for said oscillator.

* * * * *